May 24, 1966  L. J. LOGAN  3,253,115
WELDING STUD
Filed Nov. 13, 1964  6 Sheets-Sheet 1
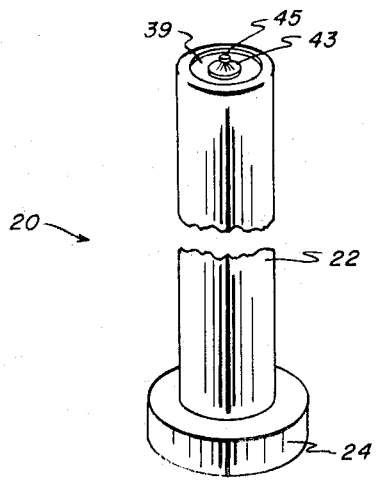
Fig. 1
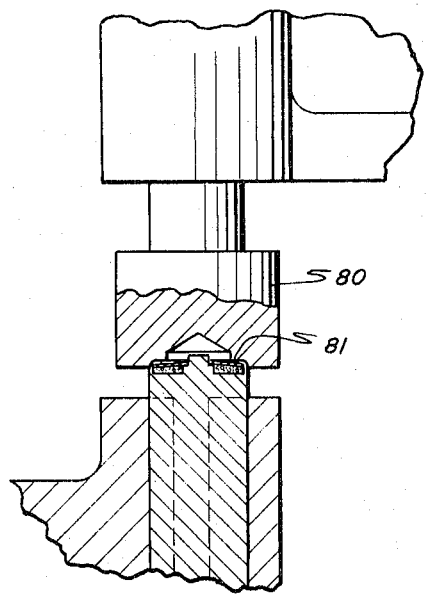
Fig. 6
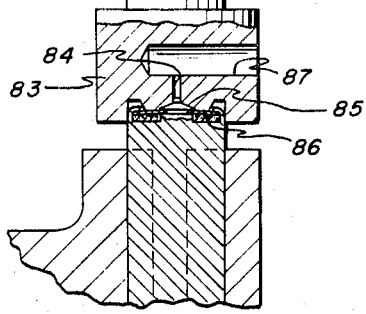
Fig. 7
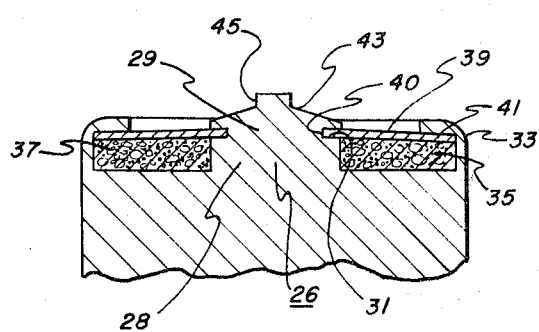
Fig. 2
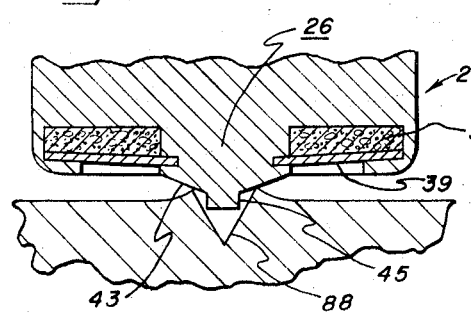
Fig. 8
INVENTOR.
LEWIS J. LOGAN
BY
Wooddling, Krost, Granger + Krost
Attys

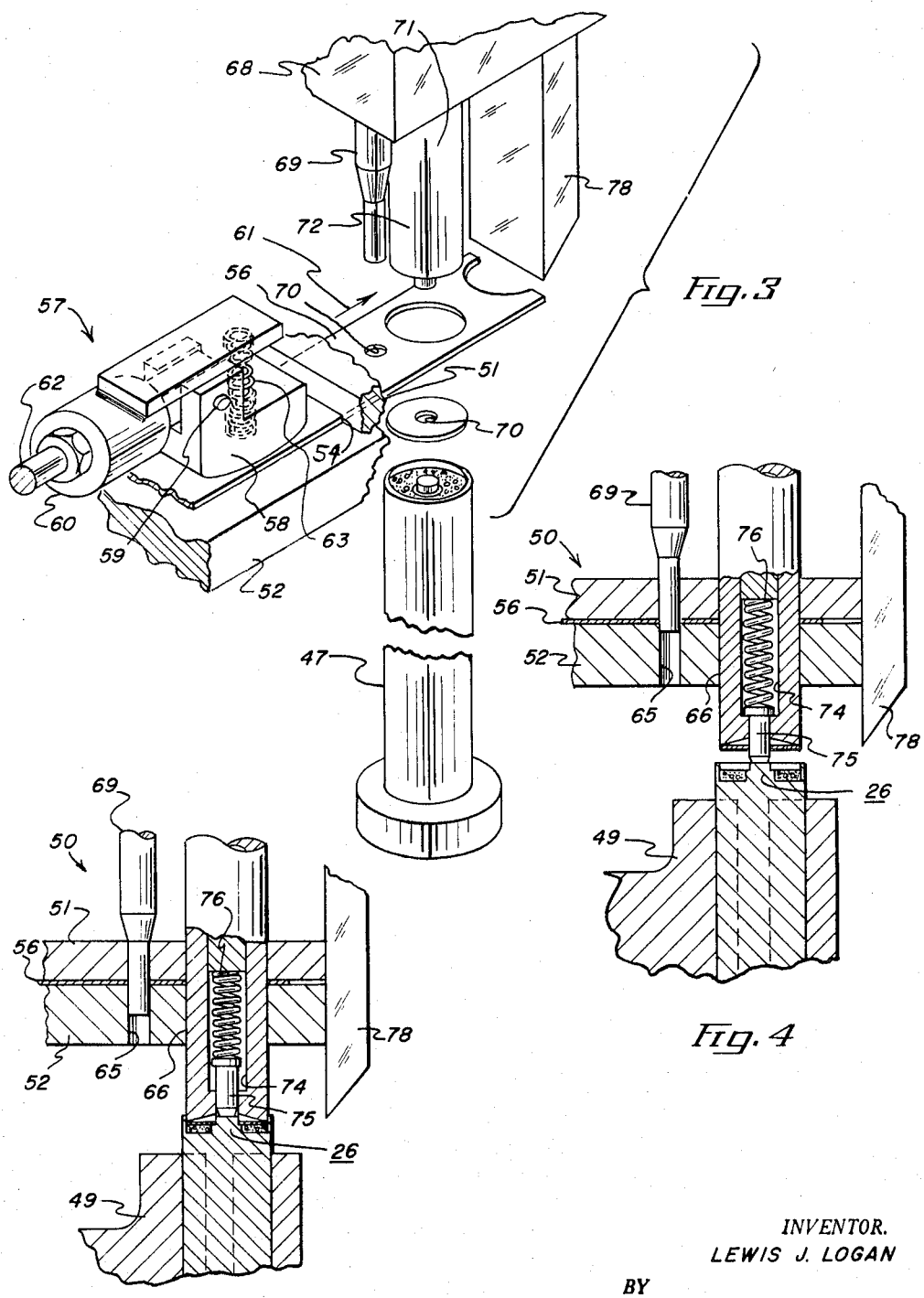

May 24, 1966 L. J. LOGAN 3,253,115
WELDING STUD
Filed Nov. 13, 1964 6 Sheets-Sheet 3
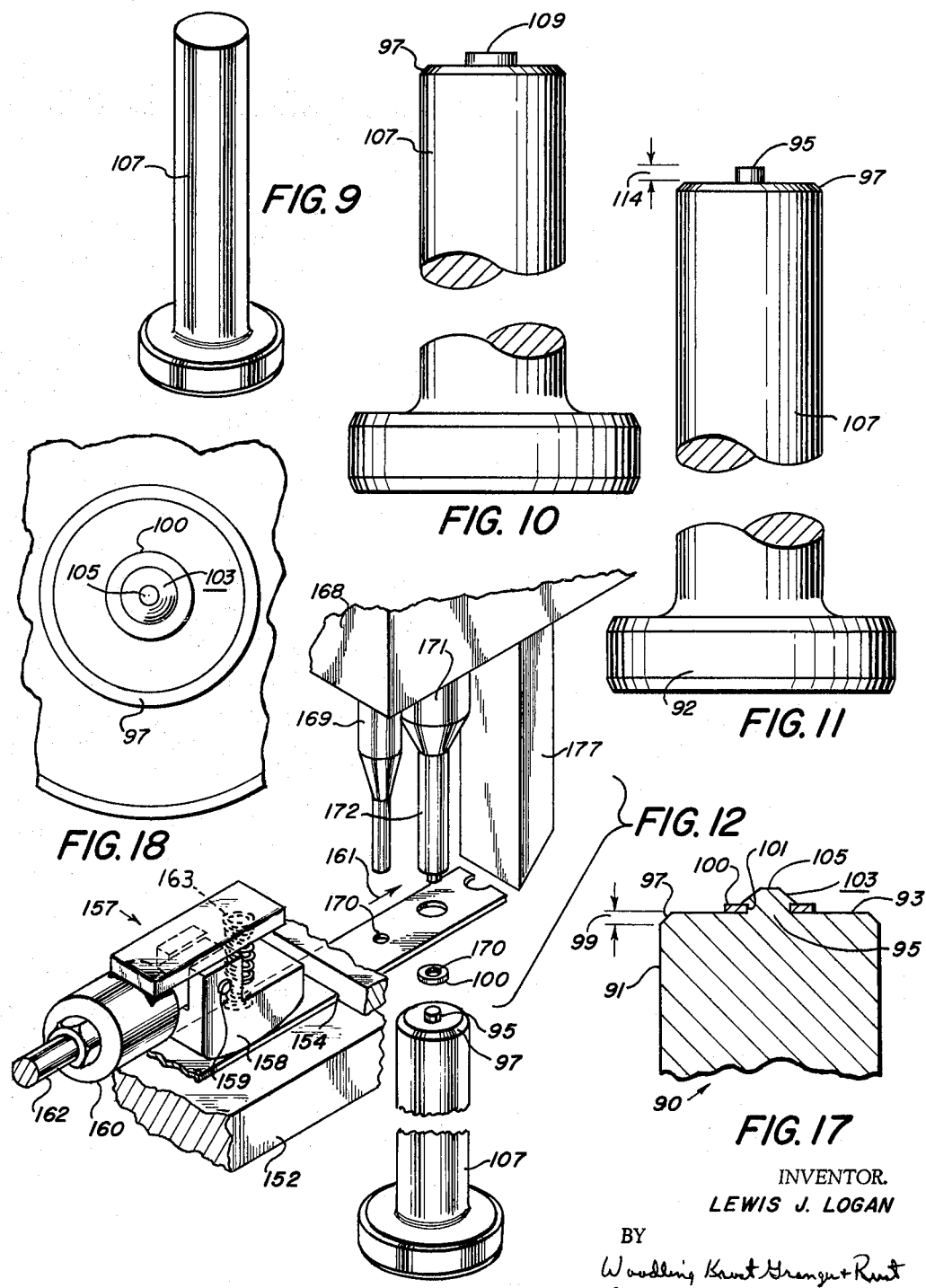
INVENTOR.
LEWIS J. LOGAN

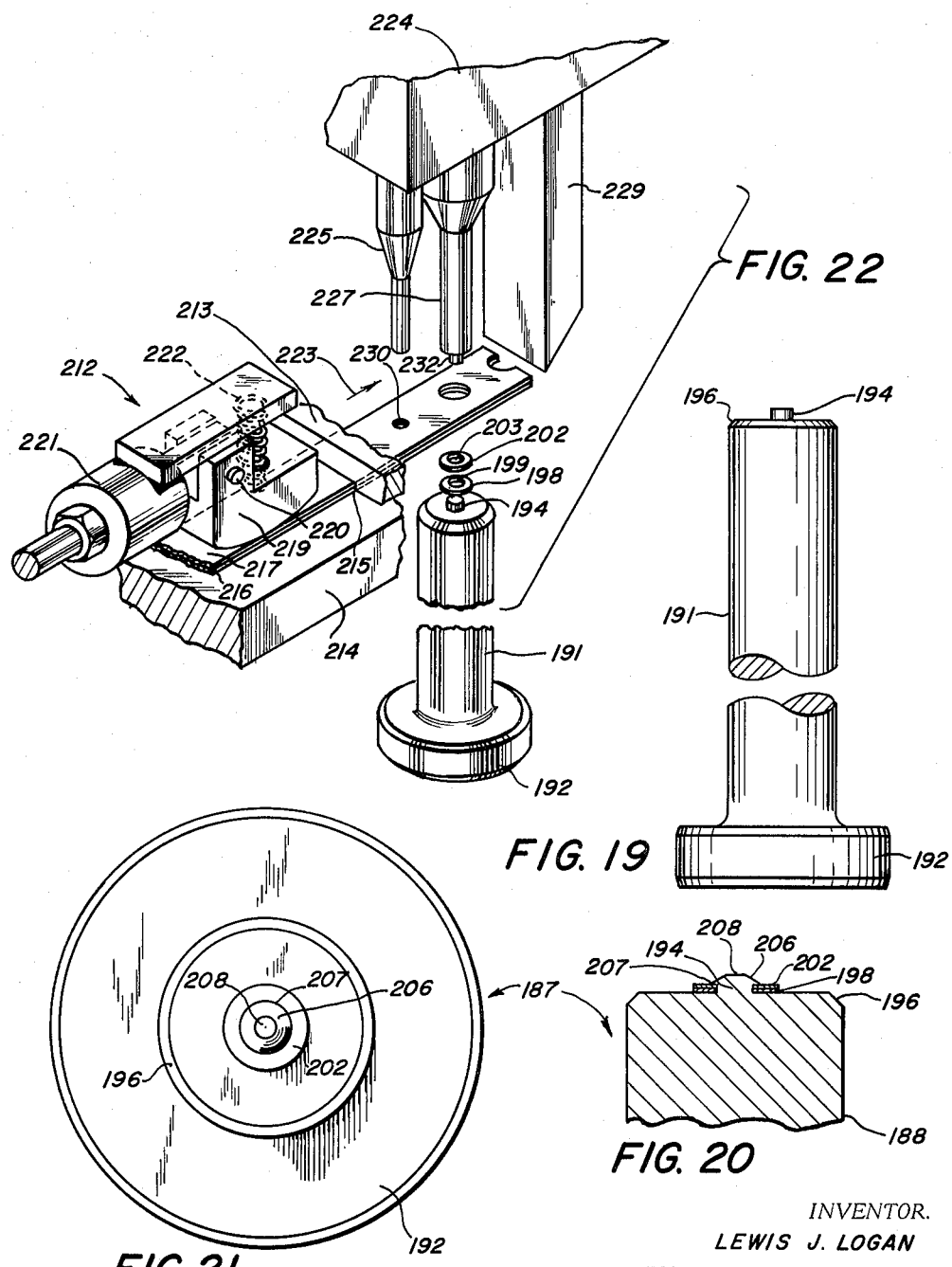

May 24, 1966 L. J. LOGAN 3,253,115
WELDING STUD

Filed Nov. 13, 1964 6 Sheets-Sheet 6

INVENTOR.
LEWIS J. LOGAN
BY
Woodling Kwist Granger & Rust

United States Patent Office 3,253,115
Patented May 24, 1966

3,253,115
WELDING STUD
Lewis J. Logan, 11820 Edgewater Drive,
Lakewood 7, Ohio
Filed Nov. 13, 1964, Ser. No. 412,289
4 Claims. (Cl. 219—99)

This application is a continuation-in-part application of United States patent application Serial No. 316,623, filed October 16, 1963, which is a continuation-in-part application of United States patent application Serial No. 132,421, filed August 18, 1961, now abandoned.

The present invention relates in general to the welding art and more particularly to apparatus and method for making a welding stud as well as the construction of the welding stud.

An object of the present invention is to provide a welding stud or shear connector which has markedly superior welding qualities.

Another object of the present invention is to provide apparatus for producing an improved welding stud.

Another object of the present invention is to provide a method for making an improved welding stud.

Another object of the present invention is to provide apparatus for placing a closure member over a chamber.

Another object of the present invention is to provide a method for placing a closure member over a chamber.

Another object of the present invention is to provide apparatus for producing a welding stud which initially has its flux in the form of metal particles, compacted with sufficient force to make what may be referred to as a wafer-like body or a substantially unitary body.

Another object of the present invention is to provide a method for producing a welding stud which includes the step of compacting the flux, originally in the form of metal particles, into a wafer-like body or a substantially unitary body.

Another object of the present invention is to provide apparatus for cutting a closure member from metal stock and carrying the closure member to its position of use.

Another object of the present invention is to provide a method for cutting a closure member from metal stock and carrying the closure member to its position of use.

Another object of the present invention is to provide a welding stud or shear connector which includes a tip with a generally flat end portion which is formed as a continuation of the parent metal of the stud with compacted metal flux particles surrounding the continuation.

Another object of the present invention is to provide a welding stud which is of such construction that it may be located easily at the position where it is to be used.

Another object of the present invention is to provide a welding stud which has better arc initiation.

Another object of the present invention is to provide a welding stud which has its flux of metal particles compressed together to form what may be described as a substantially unitary body.

Another object of the present invention is to provide a welding stud which includes a chamber defined by a post member and an annular wall member which is bent over to contain the outer peripheral wall of a closure member which covers the chamber with an opening which fits over the post member which is then provided with tapered wall means which aid in holding the closure member on the post member which tapered wall means terminate in an annular tip.

Another object of the present invention is to provide a welding stud which has a solid flux member.

Another object of the present invention is to provide an apparatus for producing a welding stud with a solid flux member.

Another object of the present invention is to provide a method of making a stud with a solid flux member.

Another object of the present invention is to provide a welding stud which has a solid type flux which is held in position by a continuation of the metal of the stud proper to provide what may be referred to as parent metal arc initiation.

Another object of the present invention is to provide a welding stud which has an extreme end formed generally by surface means which describe the surface of at least a portion of a cone which provides a new and ready means of locating the stud in holes on a surface, for example in a prick punch on a metal beam.

Another object of the present invention is to provide a method and apparatus for producing a welding stud with a solid type flux which provides a consistent mechanism for providing a constant height on the arc initiating end of the stud and this means and apparatus also provides a mechanism for keeping the solid type flux member from being substantially distorted or moved out of position.

Another object of the present invention is to provide a method and apparatus for conveniently punching out an annular solid type flux member from a continuous ribbon of flux material and conveniently positioning the solid type flux material on the welding stud.

Another object of the present invention is to provide a method and apparatus for making and positioning an annular member in position on a post member.

Another object of the present invention is to provide a method of making a welding stud which conveniently combines at least two solid flux members together.

Another object of the present invention is to provide a welding stud which has a plurality of solid flux members connected thereto.

Another object of the present invention is to provide an apparatus for producing a welding stud having a plurality of solid flux members connected thereto.

Another object of the present invention is to provide a method of making a weldable member having a plurality of solid flux members connected thereto.

Another object of the present invention is to provide a welding stud which has a plurality of solid type flux members held in position by a continuation of the metal of the welding stud proper to provide for parent metal arc initiation.

Another object of the present invention is to provide a method and apparatus for conveniently simultaneously punching out annular solid type flux members from a plurality of continuous ribbons of flux material and conveniently positioning the annular solid type flux members in a fixed position on the welding stud.

Other objects and a fuller understanding of this invention may be had by referring to the following description and claims, taken in conjunction with the accompanying drawings, in which:

FIGURE 1 is an isometric view of a welding stud of the present invention as produced by the method and apparatus disclosed herein;

FIGURE 2 is an enlarged fragmentary view in cross section of one end of the welding stud shown in FIGURE 1;

FIGURES 3, 4 and 5 are views of the apparatus utilized in the present invention in various stages of applying a closure member to the welding stud;

FIGURE 6 is a view showing the step of crimping a cavity wall of the welding stud over the peripheral edge of the closure member to aid in holding the same in place;

FIGURE 7 shows the final step in accordance with the teachings of present invention which produces the end on the parent metal center post member as well as compacting the welding flux;

FIGURE 8 is a view illustrating the end of the welding stud as associated with a punch mark on a metal beam;

FIGURE 9 is a view of a metal blank from which a solid flux type stud is made or may also be a blank from which the stud of FIGURE 1 is made;

FIGURES 10 and 11 illustrate successive machining operations which are performed upon the blank shown in FIGURE 9 toward producing a finished welding stud;

FIGURES 12, 13 and 14 are views of the apparatus utilized in accordance with the teachings of the present invention in applying a solid type flux member to the machined blank which is shown in FIGURE 11;

FIGURE 17 is an enlarged view showing the finished end of the solid flux type welding stud;

FIGURE 18 is a plan view of the stud shown in FIGURE 17;

FIGURE 19 is an elevational view of a metal blank similar to the blank of FIGURE 11 from which a solid flux type stud is made which carries a plurality of solid flux members;

FIGURE 20 is an enlarged view showing the finished end of the multiple solid flux type welding stud;

FIGURE 21 is a plan view of the stud shown in FIGURE 20; and

FIGURES 22, 23, 24 and 25 are views of the apparatus utilized in accordance with the teachings of the present invention in producing the multiple solid flux type welding stud shown in FIGURES 20 and 21.

Figure 13:
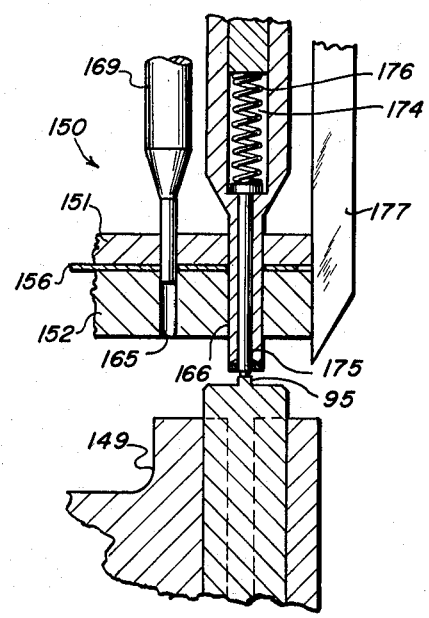

The completed welding stud, often times referred to as a shear connector in the art, is best seen in FIGURES 1, 2 and 8 of the drawings. The stud has been indicated generally by the reference numeral 20 and as noted includes a cylindrical metal member 22 which has first and second end portions. An enlarged head 24 is provided on one end of the cylindrical member in any suitable manner but preferably by what is known in the metalworking art as a "heading operation." The other end of the cylindrical member 22 comprises a central post member 26 which is integral with the cylindrical metal member. In other words, it may be said that the post member 26 is a continuation of the parent metal of member 22. The central post is provided with a lower larger diameter portion 28 and an upper smaller diameter portion 29, and these two are connected by means of an annular shoulder 31. A cavity wall member 33 is formed which is integral with the circumferential portion of the cylindrical metal member 22 and is of substantially the same diameter as the metal member and is spaced from and extends around the central post member 26 to define a cavity or chamber 35. This cavity or chamber 35 is filled with welding flux 37 which is understood by those skilled in the art and in this particular embodiment comprises granules or particles of metal more specifically in this instance of iron and aluminum.

A closure member 39 is provided which has a central opening which fits over the upper smaller diameter portion 29 with the annular shoulder 31 limiting its downward movement and the peripheral edge portion 41 of the closure member is located adjacent the cavity wall 33. The extreme upper end of the cavity wall is crimped or bent over to cover the peripheral edge 41 of the closure member and prevent outward axial movement of the closure member. Immediately above the upper surface of the closure member 39 the upper smaller diameter portion 29 is formed with what may be referred to as surface means 43 thereon. This surface means 43 may be referred to as tapered surface means and more specifically may be stated to define at least a portion of the surface of a cone, with the diameter of the cone immediately adjacent the upper surface of the closure member being larger than the central opening in the closure member. It will be appreciated that this construction in addition to other functions, prevents removal of the closure member from the central post. The surface means 43 as it continues upward terminates in a cylindrical or annular tip 45 with a substantially flat end.

In conventional prior art devices the welding flux which is contained within cavities is contained therein with the various particles which make up the welding flux in a loose or free flowing state. In other words, if the cap or similar closure were removed from conventional prior art welding studs the flux would normally fall out or flow from the cavity in much the same manner as salt from a salt shaker. In the present invention, however, the particles which comprise the flux, more specifically in this instance iron and aluminum, are compressed together with sufficient force to prevent the free flow of the same from the cavity if and when the closure member is removed. The apparatus and method for accomplishing this will be described hereinafter, however, it may be said that the preferred force which is utilized to compress the iron and aluminum particles in effect cold welds the particles together and imbeds some of the particles in the lower surface of the cavity as well as to the underside of the closure member 39. Although the theory for the excellent results obtained by the welding stud of the present invention is not completely understood, it is applicant's opinion that the parent metal center post in combination with the firmly compressed welding flux which surrounds the same are very helpful.

The apparatus and steps involved in producing the welding stud shown in FIGURES 1, 2 and 8 are best seen in FIGURES 3 through 7. What may be referred to as a welding stud blank 47 is provided which in most respects is identical to the finished stud 20 shown in FIGURES 1, 2 and 8 with the exception that the cavity wall 33 is not crimped or bent over as described and the surface means 43 and cylindrical tip 45 are not yet provided on the upper smaller diameter portion 29 of the central post member 26. The cavity 35 in the end of the welding stud blank as well as the annular shoulder 31 are provided by conventional boring operations well known to those skilled in the metalworking art and the cavity is filled with the welding flux 37 as shown. The welding stud blank 47 with the welding flux therein is then moved into apparatus for making the finished stud. This apparatus includes in combination means 49 for holding the stud in a generally vertical position as shown. Support means 50 which includes first and second plate members 51 and 52 respectively are provided immediately above the welding stud, and wall means 54 serve to define a generally rectangularly shaped guideway in the facing surface of either one or both of the first and second plate members which guideway is adapted to receive a rectangularly shaped piece of metal stock 56. The metal stock 56 is preferably in a continuous roll from which it can be fed to the apparatus as desired. Means 57 are provided for feeding the metal stock 56 into the guideway 54 in predetermined increments. This means includes a cam member 58 pivoted at 59 to a connector 60 which in turn is driven in the direction of arrow 61 through the medium of an air cylinder and piston not shown and piston rod 62 which is connected to the piston. It will be readily appreciated that movement of the assembly in the direction of arrow 61 causes the cam 58 to engage and drive the metal stock 56 in the guideway and movement in the reverse direction does not affect the metal stock in any manner. A light spring 63 produces a small pressure tending to maintain the cam member 58 in engagement with the metal stock 56. The first and second plate members 51 and 52 are provided with first and second openings 65 and 66 respectively for a purpose which will be described immediately hereinafter. These openings extend through the guideway.

A vertically movable head 68 is provided and is driven through its up and down movement by conventional mechanism, the details of which are not shown herein. A first punch member 69 is carried by the vertically movable head 68 and is adapted to move the punch member 69 through the first opening 65 to produce a first hole 70 in the metal stock as shown in FIGURE 3. A second punch member 71 is also carried by the vertically movable head 68 and has an end portion 72 which is movable through the second opening 66 in the first and second plate members to cut a circular closure member from the metal stock 56. The circular closure member has been numbered 39 the same as the closure member described in conjunction with FIGURES 1 and 2. The end portion 72 of the second punch member is provided with wall means which define a central axial opening 74 and a pin member sometimes referred to as retractible means is provided in the opening 74 and extends therefrom in a first position (FIGURE 4) and is retracted into the opening 74 in a second position (FIGURE 5). A spring 76 is provided in the opening and constantly urges the pin member 75 to its extended position (FIGURE 4).

The operation of the apparatus described in FIGURES 3, 4 and 5 is as follows: With the metal stock in the position shown in FIGURE 3 the vertically movable head is moved downwardly which causes the first punch member 69 to punch a first hole 70 in the metal stock. This downward movement causes the pin member 75 to enter a previously punched first hole 70 and being of a slightly larger diameter the pin member wedges itself into this hole. Further downward movement causes the second punch member to cut a closure member 39 from the metal stock around the first hole which is picked up by the pin member. Further downward movement as shown in FIGURE 4 causes the closure member to be carried toward the cavity in the end of the welding stud and the pin member 75 engages the central post member 26 and against the urging of spring 76 the pin is retracted into the opening 74 and slides out of the first hole 70. Further movement pushes the first hole over the upper smaller diameter portion 29 of the central post member (FIGURE 5). The upper smaller diameter 29 is preferably made slightly larger than the first hole 70 so there is a slight wedging action tending to hold the closure member on the central post member. The action of the second punch member shown at FIGURE 5 exerts a force to initially place the closure member in position and also tends to level out the flux in the cavity. The force applied is applied in a steady or constant manner, sometimes referred to as a "squeeze" and in this embodiment the total force exerted by the second punch member at FIGURE 5 is 1000 to 1200 pounds. The pounds per square inch are of course determined by dividing the number of square inches engaged. The welding stud shown herein is ¾″ in diameter and has been drawn substantially to scale with the exception that the length has been shown as indefinite and is generally four, five or six inches. The length can of course vary depending on the end use to which the stud is to be put. In the case of studs with ⅞″ diameters, the dimensions shown are preferably proportionately enlarged. This same downward movement which has been described above causes a shear blade 78 which is carried by the vertically movable head to sever the previously used end of the metal stock. The vertically movable head is then raised to render it ready for a subsequent similar operation and while it is being raised the feeding means 57 is actuated to feed another increment of the metal stock in the guideway. This moves the first hole 70 just made by the first punch member 69 into line with the pin member 75 so it will be picked up in the subsequent operation in the manner just previously described.

The welding stud with the closure member in place is then moved to another station as shown in FIGURE 6, or by the same token the stud may remain in the same position and the operating head may move to bring the apparatus of the next step into position above the stud. The welding stud is held in a manner similar to that shown in FIGURES 4 and 5 and a vertically movable crimping punch 80 is provided at this station. The crimping punch 80 is provided with wall means 81 which are adapted to engage the cavity wall member 33 in the manner shown to bend over or crimp the uppermost portion of the wall over the perimeter or peripheral edge portion 41 of the closure member 39. This is accomplished as shown. The types of action of punch 80 is of the impact force type rather than a squeeze as used with punch 71. In other words, the mechanism is such that the punch is mechanically held in position until a predetermined driving pressure is built up and then the mechanical holding means is suddenly released. In the crimping operation it has been found to be preferable to use a total force in the range of from 4,000 to 15,000 pounds.

The welding stud is then moved to a subsequent station which is shown in FIGURE 7 or the stud may remain stationary and an operation head may move. A vertically movable staking punch 83 is provided at this station which has a centrally located relief opening 84 terminating at its lower end in tapered wall means 85. The staking punch 83 is also provided with compacting wall means 86 which compacting wall means as will be noted engages the closure member between the central post and the crimped cavity wall which provides the necessary force to compress the flux granules together so they will not flow from the cavity if the closure member is removed. The force applied to the staking punch to cause vertical movement of the same into engagement with the welding stud causes the tapered wall means 85 to engage the central post and form the surface means 48 on the finished stud and the relief opening 84 forms the cylindrical tip with a substantially flat end. Subsequent operations of the staking punch results in bits of metal being left or deposited in the relief opening 84 and as a result the staking punch is provided with an opening 87 which gives relief to the outside of the staking punch and any bits of metal are forced up through the relief opening 84 and subsequently may travel out opening 87. The force which is applied to drive the staking punch in its downward vertical movement in this embodiment is on the order of 4,000 to 15,000 pounds. This force is utilized in compacting the flux by the wall means 86 and also provides the surface means 43 as well as the cylindrical tip 45. In many instances the tip 45 is shorter than that shown and sometimes is flat forming merely a flat surface at the top of the frustrum of a cone as defined by the surface means 43. This force is of an impact type as used with punch 80. It will be appreciated that if the same compacting action of the flux is to be accomplished by a force other than the impact type, for example by a squeeze type action, then the force would have to be higher. In the operation of FIGURE 7, the force utilized may be higher than that range given above and it has been found that it is possible to go down to 800 to 1000 pounds but the end result is to compact the flux particles together and in the cavity with such force that they are not easily dislodged. With the preferred forces used as cited above, it is necessary to take something like a screwdriver to scrape the flux from the cavity.

FIGURE 8 shows the tip of the welding stud as associated with a punch mark 88 in a steel beam. It will be observed that the annular or cylindrical tip 45 serves to locate the stud relative to the punch mark and thereby position the same in a proper manner on the beam. The punch mark 88 is formed by tapered wall means with the outer portion thereof engaging the surface means 43 on the welding stud.

It will thus be seen that a new and novel apparatus and method has been provided for producing a welding stud or shear connector which has superior qualities. The apparatus and method of the present invention has also disclosed how to produce and apply a closure member to cover a cavity. The weldable member of the present invention by means of the construction which has been hereinabove described provides a convenient means of locating the stud along with improved arc initiation and a construction wherein the closure members is more securely secured in place as well as other advantages. The improved results flowing from the present construction although not completely understood are believed to flow from the construction wherein the flux is securely compacted into place around the center posts with the improved end construction which center post is a continuation of the parent metal. It is believed that with this construction that during the welding operation when the closure member is burned off the flux is maintained in the position shown and is not blown out of position as in many prior art devices and is available for its intended use as needed.

Figure 14:
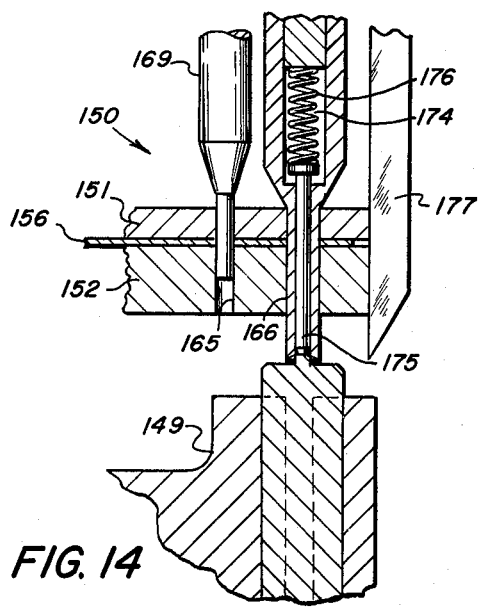
Figure 15:
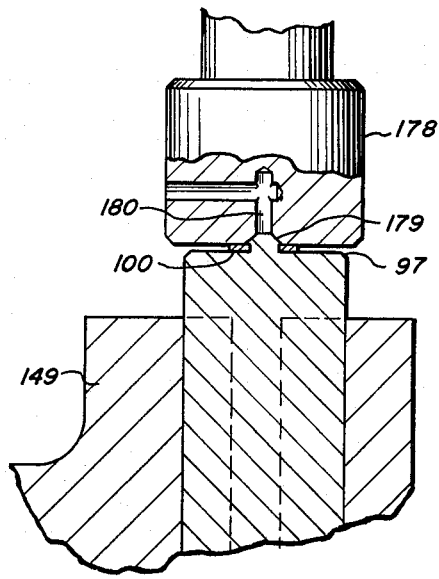
FIGURES 15 and 16 illustrate successive crimping operations which form the outer-most end of the central post of the stud which is shown in FIGURES 11 through 14.
Figure 16:
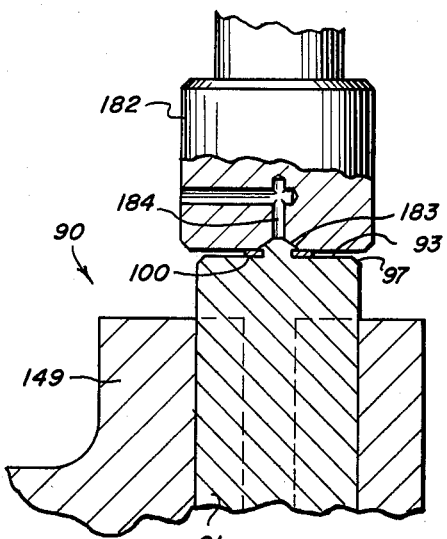

The solid flux type welding stud shown in FIGURES 16 and 17 has been indicated generally by the reference numeral 90 and the steps and apparatus involved in producing the stud are depicted in FIGURES 9 through 16. This welding stud includes in combination a cylindrical metal member 91 having an enlarged cylindrical head 92 on a first end portion with the opposite second end comprising the end which is ultimately to be welded to a metal member. The weld end 93 comprises a central post member 95 which is integral with the cylindrical metal member 91 and as will be noted, extends axially outwardly a given distance from the end of the cylindrical metal member. The outer peripheral edge 97 of the cylindrical metal member around the central post is beveled at substantially a 45 degree angle. A generally flat solid cylindrical aluminum welding flux member 100 flatly engages the end of the metal member 91 and has a central circular opening 101 which wedgingly fits over and engages the central post. The circular opening 101 is designed to be a few thousandths smaller than the size of the post so as to provide the wedging fit. This will be discussed more completely hereinafter. The flux member is preferably provided with a constant diameter for stud sizes in the range of from 5/16 inch to 7/8 inch and the volume of the flux member is varied by varying the thickness thereof from 0.10 inch to .032 inch. The post diameter is also preferably kept constant over this range of sizes. The preferred ranges for the bevel and the thickness of the flux member in relation to the stud size is given the chart hereinbelow. The bevel dimension is measured by the distance 99 as seen in FIGURE 17.

| Nominal Stud Diameter | Actual Stud Diameter | Bevel | Flux Thickness |
|---|---|---|---|
| 5/16" | .275 | .010 | .010 |
|  | .312 | .020 | .010 |
| 3/8" | .310 | .020 | .010 |
|  | .330 | .020 | .010 |
|  | .375 | .032 | .016 |
| 7/16" | .373 | .032 | .016 |
|  | .387 | .032 | .016 |
|  | .437 | .047 | .016 |
| 1/2" | .435 | .047 | .016 |
|  | .448 | .047 | .020 |
|  | .500 | .047 | .020 |
| 5/8" | .500 | .047 | .020 |
|  | .562 | .047 | .020 |
|  | .625 | .062 | .025 |
| 3/4" | .625 | .062 | .025 |
|  | .680 | .062 | .025 |
|  | .750 | .062 | .032 |
| " | .750 | .062 | .032 |
|  | .798 | .078 | .032 |
|  | .875 | .078 | .032 |

The central post 95, outwardly of the flux member 100, comprises surface means 103 which define at least a portion of the surface of a cone or at least a surface which comes very close to that of a cone. The larger diameter of this surface is located just adjacent the solid flux member and has a larger diameter than that of the opening in the flux member so that the flux member is held securely in place. For example, the circular opening on the flux member is on the order of .115 inch whereas the larger diameter of the surface means may range from .130 to .150 inch. The surface means 103 terminate in a tip with a substantially flat end 105 and the diameter of this flat end is smaller than the circular opening in the flux member. The diameter of this end is on the order of .047 inch. The length of the central post 95 is on the order of .062 inch whereas the outside diameter of the flux member 100 is on the order of .250 inch. The central post diameter is preferably maintained in the range of from .115 to .125 inch and the inside diameter of the flux member is preferably maintained in the range of .112 inch to .115 inch. This assures that the flux member will be wedgingly attached to the central post.

FIGURES 9 through 16 illustrate the apparatus and method for arriving at the finished stud construction illustrated in FIGURES 16 and 17. The blank 107 shown in FIGURE 9 may be maintained in one position and the various operations illustrated in FIGURES 10, 11, 12 through 14, 15 and 16 may be moved into position over the blank, or as in the preferred embodiment in this application, the blank may be indexed along to various positions where the machiner is located for performing the various operations thereon and which will be described hereinafter. FIGURE 10 illustrates the blank 107 which has just had a milling operation performed thereon so as to provide the bevel 97 and an initially roughed central post 109. The blank is then indexed to the position of FIGURE 11 and another milling operation is performed thereon which completes the central post 95 and makes it to the desired height and outside diameter. The blank from FIGURE 11 is moved into the position shown in FIGURES 12, 13 and 14. The blank in this position is held in place by holding means 149 and support means 150 which include first and second plate members 151 and 152, respectively, are provided immediately above the welding stud. Wall means 154 serve to define a generally rectangularly shaped guideway in the facing surface of either one or both of the first and second plate members, which guideway is adapted to receive a rectangularly shaped piece of aluminum flux material stock 156. The flux material stock 156 is preferably in a continuous roll from which it can be fed as desired. Means 157 are provided for feeding the flux material stock 156 into the guideway 154 in predetermined increments. This means includes a cam member 158 pivoted at 159 to a connector 160 which in turn is driven in the direction of arrow 161 through the medium of an air cylinder and piston not shown and piston rod 162 which is connected to the piston. Movement of the assembly in the direction of arrow 161 causes the cam 158 to engage and move the flux material 156 in the guideway and movement in the reverse direction does not affect the flux material stock in any manner because of the positioning of pivot 159. A spring 163 produces a small pressure to maintain the cam member 158 in engagement with the flux material stock 156. It will be appreciated that other types of material may be used for the flux other than aluminum.

A vertically movable head 168 is located above the guideway which carries the stock 156 and is driven through its up and down movement by a conventional mechanism as in the device shown in FIGURE 3. A first punch member 169 is carried by the head and is adapted to move through an opening 165 to produce a first hole 170. A second punch member 171 is also carried by the head and is movable through another opening 166, and this punch is adapted to cut the flux member 100 from the strip of flux material stock 156. The lower end portion 172 of the second punch member 171 is provided with an axial opening 174 which houses a pin member 175 which is urged outwardly at all times by means of a spring 176.

The operation of the apparatus shown in FIGURES 12, 13 and 14 is basically as follows, and serves to cut the flux member 100 from the strip of flux stock 156 and place the removed flux member onto the stud as shown in FIGURE 14. With the parts of the apparatus as shown in FIGURE 12, the head 168 is moved downwardly and the pin member 175 initially picks up a first hole 170 which has been previously punched by the punch member 169. Further downward movement of the head causes the second punch 171 to punch or cut a circular flux member 100 from the flux material stock 156 and further movement causes the end of the pin member 175 to engage the extreme upper end of the central post 95 as shown in FIGURE 13. Further downward movement causes the pin member to be retracted into the opening 174 and the flux member 100 to be pushed onto the central post into a wedging type engagement. A shear blade 177 cuts the used stock off. The vertically movable head is then raised to render it ready for a subsequent similar operation and while it is being raised the feeding means 157 is actuated to feed another increment of the flux material stock 156 in the guideway. This moves another hole 170 made in the previous operation in line to be picked up in the next operation by means of the pin member 175. The picking up of the opening 170 by the pin member is accomplished primarily by very slight wedging action by making the pin member just barely larger than the size of the hole 170.

The welding stud is next moved to the position shown in FIGURE 15 and at this station a crimping hammer 178 is provided which has surface means 179 of substantially the shape shown and what is commonly referred to as a weep hole 180 is provided. The crimping hammer 178 is brought into engagement with the upper end of the central post 95 and provides an initial forming of the central post member as shown in FIGURE 15. The next and final station is shown in FIGURE 16 and in this position a crimping hammer 182 is provided which is quite close in construction and shape to that shown in FIGURE 15. In this figure, however, the surface means 183 are more on a straight line than that shown in FIGURE 15 and serve to make the final shape of the surface means on the welding stud to conform fairly closely to the frustrum of a cone. Also, in the crimping hammer 182 the weep hole 184 is slightly smaller, thus, making the completed flat end 105 smaller in diameter. By utilizing this type of final crimping operation, the angle of the sides of the surface means 103 are substantially 45 degrees from the vertical, and by means of these operations, an end or tip is provided on the welding stud which enables one to locate the stud in punch marks which are commonly provided on metal beams so as to more accurately locate the studs. The location of the stud 90 in a punch mark is similar to that shown in FIGURE 8 with the surface means 103 engaging the sides of the punch mark. Also, the total height of the central post indicated at 114 is maintained substantially constant from that position shown in FIGURE 11 to the completed stud shown in FIGURES 16 and 17. This insures much more accuracy in the final welding phase of the stud. Also by means of providing the surface 103 as described hereinabove on the finished stud, it is possible to maintain the flux member 100 in substantially its original form and shape without flattening the same in a distorted manner or completely distorting the outer periphery thereof. The bevel 97 on the outer edge of the stud also gives much better metal flow during the welding operation, particularly in the larger size studs.

The multiple solid flux type welding stud indicated generally by the reference numeral 187 is best shown in FIGURES 20 and 21 of the drawings, and as seen, this welding stud 187 includes a generally cylindrically shaped metal member 188 having first and second end portions. An enlarged cylindrical head 192 is provided on one of the end portions and this is shown on a metal blank 191 seen in FIGURE 19 and in the plan view of FIGURE 21. The end of the metal member opposite the cylindrical head is provided with a central post 194 which is integral with the metal member 188 and which extends axially outwardly a given distance from the end of the metal member. The outer peripheral edge of the metal member radially outwardly of the central post is provided with a bevel 196 which bevel is at a substantially 45 degree angle to the axis of the welding stud. A flat solid cylindrically shaped first weld flux member 198 is provided on the end of the metal member and flatly engages the extreme axial end of this member and has a central opening 199 which fits around and wedgingly engages the central post 194. For the sake of example, this first weld flux member may be constructed of aluminum. A second flat solid cylindrically shaped weld flux member 202 is positioned on top of the first weld flux member 198 and flatly engages the same. This weld flux member 202 is provided with a central circular opening 203 which also fits around and wedgingly engages the central post 194. For the sake of example, this second weld flux member may be constructed of stainless steel. In the preferred design of this welding stud, the central circular openings 199 and 203 are constructed so as to be slightly smaller than the diameter of the central post. This permits, in the manufacturing operation, for the convenient and reliable securing of these two members before the extreme end of the central post is completed.

The extreme end of the central post axially outwardly of the second weld flux member is comprised of surface means which define at least a portion of the surface of a cone 206. The larger diameter 207 of the cone is located immediately adjacent the second solid flux member and is larger than the circular opening therein which serves to conveniently and reliably secure the two solid weld flux members in position. The surface means 206 terminate at their extreme axial end in a substantially flat end 208 which in the preferred embodiment has a diameter smaller than the circular openings in the solid weld flux members.

FIGURES 22 through 25 illustrate the method and apparatus used in arriving at the furnished welding stud shown in FIGURES 20 and 21. In this apparatus, as in the apparatus described hereinabove for the production of the welding studs of FIGURES 1 and 17, the metal blank 191 shown in FIGURE 19 may be maintained in one position and the various production devices may be moved or indexed into position over the blank or the blank may be indexed to various positions where the production devices are located for performing the various operations. As indicated in FIGURE 19, the blank 191 has been provided with the central post 194. In producing the blank 191 shown in FIGURE 19 it is usually necessary to perform a machining operation thereon which provides the beveled edge 196 and the central post as discussed in the manufacture of the stud of FIGURE 17.

Figure 23:
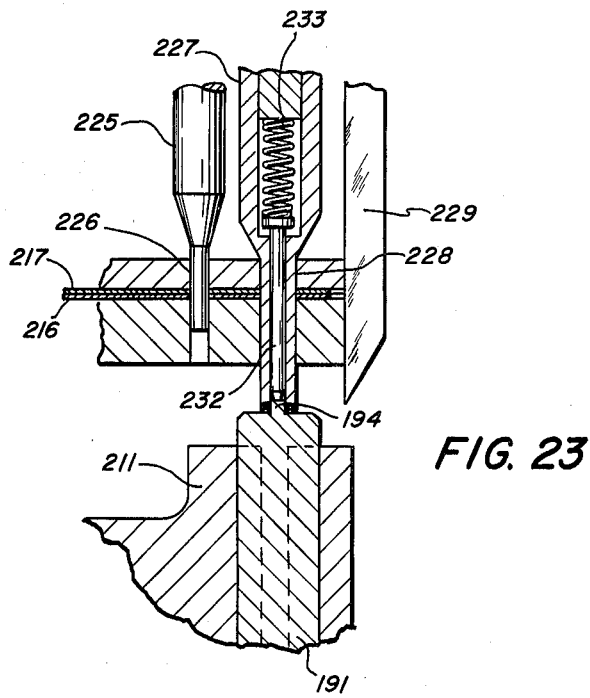

The blank in the condition of FIGURE 19 is indexed to the position shown in FIGURES 22 and 23. The blank in this position is held in place by holding means 211, and support means 212 which include first and second plate members 213 and 214 respectively are provided immediately above the welding stud blank. Wall means 215 serve to define a generally rectangularly shaped guideway in the facing surfaces of the plate members and this guideway is adapted to receive (in this particular embodiment) two rectangularly shaped pieces of solid flux material indicated by the reference numerals 216 and 217. In this particular embodiment aluminum stock 216 and stainless steel stock 217 is utilized. The flux material stock 216 and 217 is preferably in continuous rolls from which it can be continuously fed as desired. Means are provided for feeding the flux material stock into the guideway in predetermined increments and this means includes a cam member 219 pivoted at 220 to a connector 221 which in turn is driven in the direction of arrow 223 (and return) through the medium of an air cylinder and piston not shown. When the assembly is moved in the direction of arrow 223 the cam member 219 engages the flux material stock and moves the same into the guideway, however, because of the construction of the cam member reverse movement does not affect the flux material. A spring 222 provides a small pressure to insure engagement of the cam member and movement of the flux material when the assembly is moved in the direction of arrow 223.

A vertically movable head 224 is located above the guideway and is driven through its vertical movement by a conventional mechanism which has not been shown. First and second punch members 225 and 227 are carried by the head and are adapted to travel through openings 226 and 228 respectively in the plate members 213 and 214. The first punch 225 produces a hole 230 and the second punch 227 severs the solid weld flux member from the flux material stock. FIGURES 22 and 23 as will be appreciated are with the blank 191 located in the same position and FIGURE 23 demonstrates the head in a lowered position. FIGURE 22 shows the head 224 raised and prior to the stock 216 and 217 being moved forward. The second punch member is provided with a pin member 232 which extends in an axial opening therein and this pin is urged outwardly at all times by means of a spring 233. The head 224 also carries a shear blade 229 thereon which is used to cut the used weld flux stock into small pieces for convenient disposal.

A detailed description of the operation of the device shown in FIGURES 22 and 23 is not necessary at this point because the operation is essentially the same as that described in the operation of FIGURES 12, 13, and 14 in producing the modified form of the welding stud shown in FIGURES 17 and 18. In other words, the downward movement of the head 224 causes the first punch to produce the hole or opening 230 and causes the pin member 232 in the second punch member to pick up the previously produced hole 230 and the punch itself cuts the two weld flux members from the stock 216 and 217. Continued downward movement carries the flux members to the end of the blank where the pin member 232 engages the top of the post and retracts. The second punch member 227 carries the two flux members onto the post. As in the similar apparatus described hereinabove, the pin member 232 is designed to be just slightly larger than the hole 230 so that it will properly carry the two flux members to the central post 194 in the downward movement of the second punch member.

Figure 24:
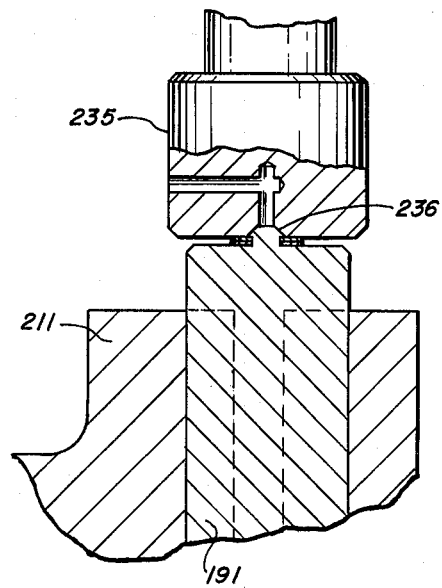
Figure 25:
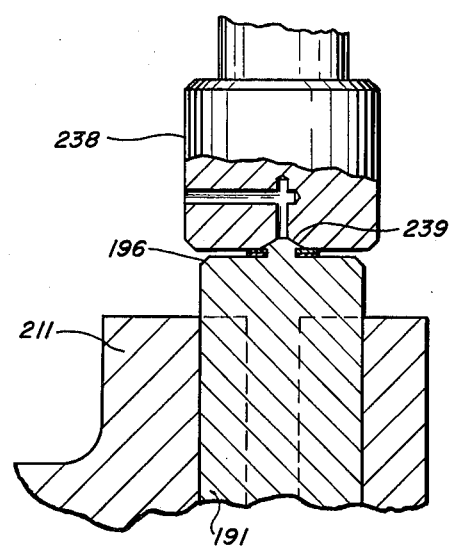

FIGURES 24 and 25 demonstrate respectively the two final operations in completing the finished end of the central post. In FIGURE 24 a crimping hammer 235 is utilized which is provided with surface means 236 as shown and this hammer is brought vertically into contact with the extreme end of the central post to initially form the end. The next station is shown in FIGURE 25 and shows a crimping hammer 238 with surface means 239. This hammer completes the finished end of the welding stud. The two hammers 235 and 238 are similar, the main difference being that the hammer 238 provides a smaller diameter at the extreme end or at the top of the conical surface and a larger diameter at the portion of the central post just adjacent the outer flux member.

It will thus be seen that by the use of the process and apparatus of the present modification that a welding stud is produced which has substantial flexibility in that a plurality of solid flux members are located on the end thereof and the weld stud can therefore be welded under conventional circumstances for example in the common welding of shear connectors to bridges wherein iron and aluminum may be used as the construction materials of the two flux members or specialized welding operations may be performed such as the welding of stainless steel welding studs wherein it is preferred that the materials of construction of the two flux members be aluminum and stainless steel. In other words, the construction of the present welding studs provides for extreme flexibility in that any number of solid welding flux materials may be applied or located on the end of the weld stud. Additionally, the process and apparatus provides a convenient and economical means for manufacturing the welding stud.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A welding stud including in combination a cylindrical metal member having first and second end portions, one of said end portions comprising a central post member integral with said cylindrical metal member and extending axially outwardly a given distance from the end of said cylindrical metal chamber, the outer peripheral edge of said cylindrical metal member outwardly of said central post being beveled at a substantially 45 degree angle, a flat, solid, cylindrical, welding flux member flatly engaging the axial end of said cylindrical metal member and having a central circular opening fitting around and wedgingly engaging said central post, said central circular opening being slightly smaller than the diameter of said central post, said welding flux member having a range of thicknesses of from .010 inch to .032 inch for stud sizes in the range of from $5/16$ inch to $7/8$ inch, the lower ends of said stud size range and said flux thickness range being closely related and both ranges relatedly progressing toward the upper ends of said ranges, said central post outwardly of said welding flux member comprising surface means which define at least a portion of the surface of a cone, the larger diameter of which is located adjacent said solid flux member and which is larger than said circular opening in said solid flux member, said surface means terminating in a tip with a substantially flat end and having a diameter smaller than said circular opening in said solid flux member.

2. A welding stud including in combination a cylindrical metal member having first and second end portions, one of said end portions comprising a central post member integral with said cylindrical metal member and extending axially outwardly a given distance from the end of said cylindrical metal member, a flat, solid, cylindrical, welding flux member flatly engaging the axial end of said cylindrical metal member and having a central circular opening fitting around and wedgingly engaging said central post, said central circular opening being slightly smaller than the diameter of said central post, said welding flux member having a range of thicknesses of from .010 inch to .032 inch for stud sizes in the range of from $5/16$ inch to $7/8$ inch, the lower ends of said stud size range and said flux thickness range being closely related and both ranges relatedly progressing toward the upper ends of said ranges, said central post outwardly of said welding flux member comprising surface means which define at least a portion of the surface of a cone, the larger diameter of which is located adjacent said solid flux member and which is larger than said circular opening in said solid flux member, said surface means terminating in a tip with a substantially flat end and having a diameter smaller than said circular opening in said solid flux member.

3. A welding stud as claimed in claim 2 wherein said flux member is aluminum.

4. A welding stud as claimed in claim 2 wherein said flux member is selected from the group consisting of aluminum, iron and stainless steel.

References Cited by the Examiner

UNITED STATES PATENTS

| | | | |
|---|---|---|---|
| 2,283,629 | 5/1942 | Heftler | 219—99 X |
| 2,421,184 | 5/1947 | Candy | 219—99 X |
| 2,688,178 | 9/1954 | Boyd et al. | 29—33 |
| 2,761,195 | 9/1956 | Hayward et al. | 29—33 |
| 2,878,363 | 3/1959 | Shoup et al. | 219—99 |
| 2,885,228 | 5/1959 | Kilemen. | |
| 2,993,982 | 7/1961 | Glover | 219—99 |
| 3,094,607 | 6/1963 | Flynn et al. | 219—99 |

FOREIGN PATENTS 715,259  9/1954  Great Britain.

RICHARD M. WOOD, *Primary Examiner.*

J. V. TRUHE, *Assistant Examiner.*